United States Patent [19]
Saitoh

[11] Patent Number: 4,626,922
[45] Date of Patent: Dec. 2, 1986

[54] PICTURE SIGNAL DISCRIMINATING CIRCUIT
[75] Inventor: Hiroyuki Saitoh, Kanagawa, Japan
[73] Assignee: Fuji Xerox Co., Ltd., Tokyo, Japan
[21] Appl. No.: 623,201
[22] Filed: Jun. 21, 1984
[30] Foreign Application Priority Data Oct. 7, 1983 [JP] Japan .............................. 58-187093

[51] Int. Cl.⁴ .............................................. H04N 1/40
[52] U.S. Cl. .................................... 358/282; 358/280; 358/284; 382/53
[58] Field of Search .................... 358/282, 280, 284; 382/53

[56] References Cited
U.S. PATENT DOCUMENTS 3,159,815 12/1964 Groce .............................. 358/282
4,234,867 11/1980 Butin .................................. 382/53
4,247,873 1/1981 Decuyper ......................... 358/282
4,329,717 5/1982 Logie et al. ...................... 358/282
4,473,847 9/1984 Kurata .............................. 358/282
4,525,747 6/1985 Sakai et al. ....................... 358/282
4,528,591 7/1985 Liepe et al. ...................... 358/282

Primary Examiner—Michael A. Masinick
Assistant Examiner—John K. Peng
Attorney, Agent, or Firm—Finnegan, Henderson, Farabow, Garrett & Dunner

[57] ABSTRACT

A picture signal discriminating circuit, having a comparator to binary-encode an analog picture signal obtained by raster-scanning an original signal, changes the threshold level for the comparator according to the signal conditions of previously binary-encoded picture signals.

3 Claims, 6 Drawing Figures

| | $S_{i,j-1}$ | $S_{i-1,j}$ | TRANSISTOR 29 | TRANSISTOR 27 | $V_R$ | |
|---|---|---|---|---|---|---|
| ① | 0 | 0 | OFF | OFF | $r_1 \cdot (r_1 + r_0)^{-1} \cdot V_P$ | HIGH |
| ② | 0 | 1 | OFF | ON | $r_1 // r_2 \cdot (r_1 // r_2 + r_0)^{-1} \cdot V_P$ | ↕ |
| ③ | 1 | 0 | ON | OFF | $r_1 // r_3 \cdot (r_1 // r_3 + r_0)^{-1} \cdot V_P$ | |
| ④ | 1 | 1 | ON | ON | $r_1 // r_2 // r_3 \cdot (r_1 // r_2 // r_3 + r_0)^{-1} \cdot V_P$ | LOW |

PICTURE SIGNAL DISCRIMINATING CIRCUIT

BACKGROUND OF THE INVENTION

Field of the Invention

This invention relates to a circuit for discriminating an analog picture signal by binary-encoding.

Description of the Prior Art

Usually an analog picture signal provided by an image pickup device or by analog transmission from, e.g., a facsimile device is binary-encoded by a picture signal discriminating circuit before it is stored or subjected to logical operation. When the analog picture signal passes through the image pickup device's optical system, however, its modulation transfer function (MTF) deteriorates mainly due to aberration of the system's optical lens or the arrangement of photoelectric conversion elements in the image pickup device. When the analog picture signal with this deteriorated MTF is then binary-encoded by the picture signal discriminating circuit, it becomes impossible to discriminate the density accurately in correspondence to the original picture.

FIG. 1(a) shows the picture data of a "line" of the original. Black regions 11 on a white background are shaded with oblique lines. FIG. 1(b) shows a typical analog picture signal 12 which is outputted by an image pickup device (such as an image sensor) reading the lens in FIG. 1(a). With analog picture signal 12's deteriorated representation of the original picture, there can be no high fidelity regardless of how the binary-encoding level is set. For instance, when a relatively high binary-encoding level $S_1$ is selected, a binary-encoded signal 14 as shown in FIG. 1(c) is obtained. It is difficult with such a high level to read white picture data $P_1$ satisfactorily on the black background. On the other hand, when a relatively low binary-encoding level $S_2$ is selected, a binary-encoded signal 15 as shown in FIG. 1(d) is obtained making it difficult to read black picture data $P_2$ satisfactorily on a white background. This deterioration also occurs with a ladder pattern in which white and black thin lines appear alternately like a ladder.

The analog picture signal provided by the image pickup device has been described. Whereas, in a facsimile device or the like, an analog picture signal provided by analog transmission is binary-encoded for recording, the same deterioration occurs because of picture quality deterioration in the transmission path.

In view of the foregoing, an object of this invention is to provide a picture signal discriminating circuit in which binary-encoding discrimination is achieved with higher fidelity.

SUMMARY OF THE INVENTION

By this invention, a threshold level is set for each picture element to be binary-encoded (hereinafter referred to as "an aimed picture element") according to the result of binary-encoding which has previously been given to a picture element adjacent to the aimed picture element (hereinafter referred to as "an adjacent picture element"). The adjacent picture element may be in the main scanning direction (the line direction), or an adjacent picture element in the auxiliary scanning direction may be added to the adjacent picture element in the main scanning direction so that two adjacent picture elements are used. By utilizing threshold levels of adjacent picture elements in this manner, binary-encoding can be achieved with high fidelity to the original although the analog picture signals have been deteriorated.

DESCRIPTION OF THE PREFERRED EMBODIMENT

Figure 1:
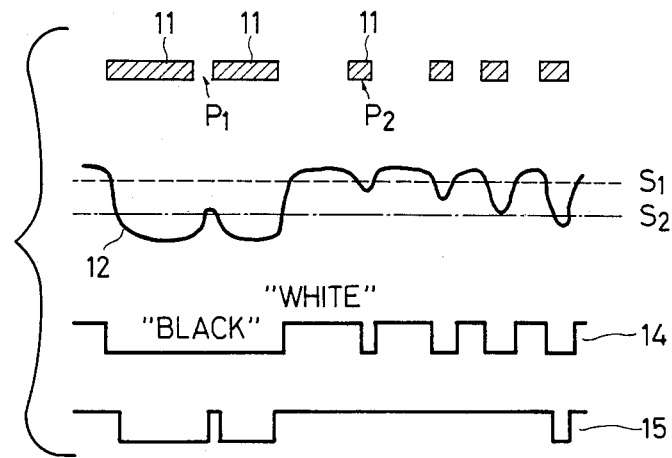
FIG. 1 is a diagram for illustrating picture signal discriminating operation of a prior art picture signal discriminating circuit.
Figure 2:
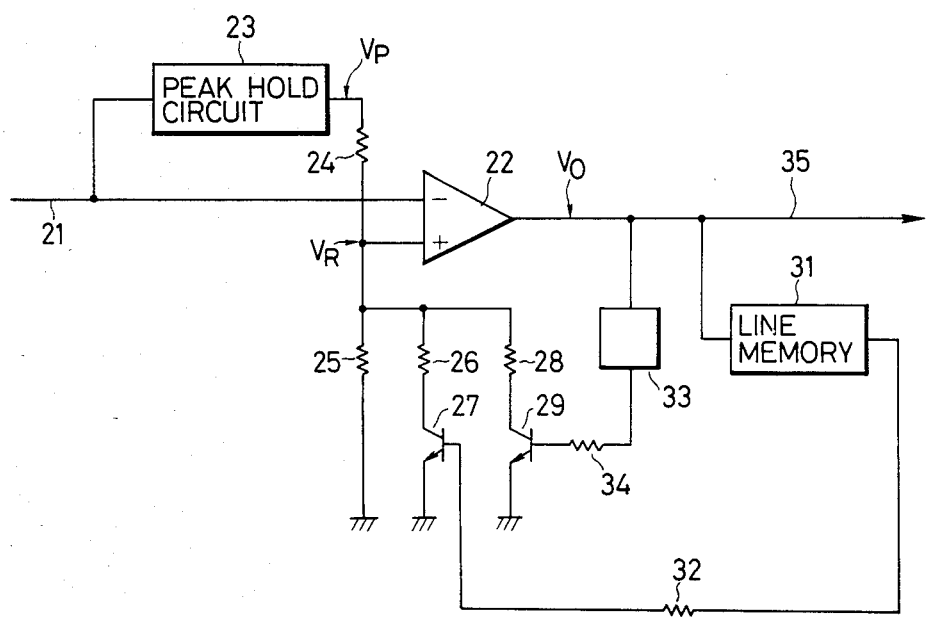
FIG. 2 is a circuit diagram of a picture signal discriminating circuit illustrating an embodiment of the invention.

FIG. 2 shows a picture signal discriminating circuit which is the preferred embodiment of the invention. An analog picture signal 21 is applied to a negative (−) input terminal of a comparator 22 and to a peak hold circuit 23 so that its peak value is detected. The peak voltage $V_P$ is divided by resistors 24 and 25 to provide a voltage $V_R$. The resistances $r_0$ and $r_1$ of resistors 24 and 25 are both 8KΩ. The voltage $V_R$ is applied to the positive (+) input terminal of the comparator 22. A series circuit of a resistor 26 and transistor 27 is connected in parallel to a series circuit of a resistor 28 and transistor 29. The resistance $r_2$ and $r_3$ of the resistors 26 and 28 are 4KΩ and 2KΩ, respectively. The output $V_O$ of comparator 22 is input to a line memory 31 and the output line memory 31 is applied through a resistor 32 to the base of transistor 27 to control its operation. The output $V_O$ is also applied to a 1-bit memory 33 and the output of memory 33 is applied through a resistor 34 to the base of transistor 29 to control its operation. The result of the comparison provided by comparator 22 is also supplied, as a binary-encoded signal 35 having a voltage $V_O$, to a binary-encoding type recording device (not shown).

Figures 3, 4:
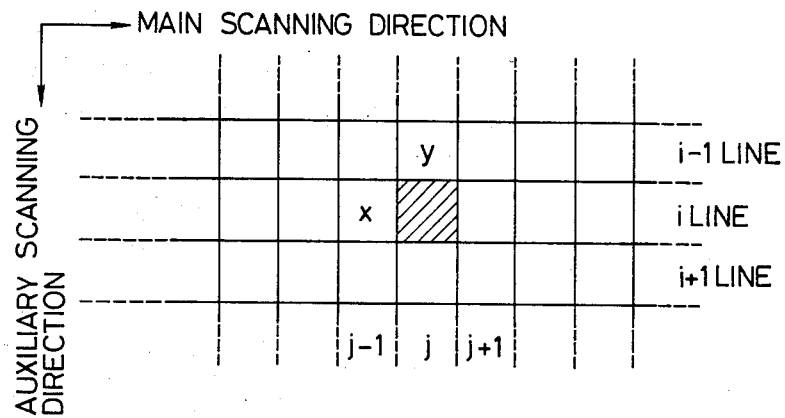
FIG. 3 is a table indicating four separate threshold levels according to various states of an original.
FIG. 4 is a diagrammatic illustration of a picture element arrangement illustrating two-dimensionally the relation of an aimed picture element and its adjacent picture elements.

In the picture signal discriminating circuit, the two transistors 27 and 29 are suitably turned on and off to provide four different voltages $V_R$ each of which is applied as a threshold level to comparator 22. FIG. 3 shows the four values with the on-off control of the transistors. In FIG. 3, when the transistors 27 and 29 are turned off, peak voltage $V_P$ is merely divided by resistances $r_0$ and $r_1$ of the resistors 24 and 25, so that the voltage $V_R$ is $r_1 \cdot (r_1 + r_0)^{-1} V_P$. When only the transistor 27 is turned off, the peak voltage $V_P$ is voltage-divided by the parallel circuit of the two resistors 25 and 28, and resistor 24. In this case, the voltage $V_R$ is as follows:

$$r_1 \| r_3 \cdot (r_1 \| r_3 + r_0)^{-1} \cdot V_P$$

where $r_1 \| r_3$ is the resistance of the parallel circuit of the resistors 25 and 28. From other on-off combinations of the transistors 27 and 29, the voltages $V_R$ can be obtained similarly as shown in FIG. 3. In FIG. 3, the voltages $V_R$ which are the threshold levels for the comparator are indicated in the decreasing order.

These threshold levels are determined according to states of signals outputted by line memory 31 and the 1-bit memory 33. The line memory 31 receives binary-encoded signals 35 for every picture element, and it holds the binary encoded signals 35 for one line and outputs them i.e. a delay of one line. The 1-bit memory 33 receives every binary-encoded signal, and outputs it with a delay of only one picture element.

In FIG. 4, picture elements corresponding to signals outputted by the memories 31 and 33 are two-dimensionally (in a plane) provided in correspondence to the surface of the original. In FIG. 4, the main scanning direction is the direction of arrangement (the line direction) of the photoelectric conversion elements in the image pickup device. It is assumed that, in the main scanning direction, the order of the picture element which is shaded with oblique lines is represented by j, the preceding order is represented by j−1, and the following order is represented by j+1. Furthermore, it is assumed that, in the auxiliary scanning direction, the shaded picture element is on the i-th line, the preceding line is represented by i−1, and the following line is represented by i+1. The shaded picture element is referred to as "an aimed picture element" which is represented by $S_{i,j}$. In this case, adjacent picture elements affecting the aimed picture element with the threshold level are as indicated at x and y in FIG. 4. These will be indicated by the following codes:

x ... $S_{i,j-1}$ y ... $S_{i-1,j}$

The logic state of the adjacent picture element $S_{i,j-1}$ is outputted by the 1-bit memory 33, and that of the adjacent picture element $S_{i-1,j}$ is outputted by the line memory 31. When the logic state of an element is "1," the respective transistor 27 or 29 is turned on accordingly, so that the collector and the emitter are rendered conductive to each other. When the logic state of an element is "0," the respective transistor 27 or 29 is turned off, so that the collector and the emitter are rendered nonconductive to each other. These are as indicated in the table in FIG. 3.

Figure 5A:
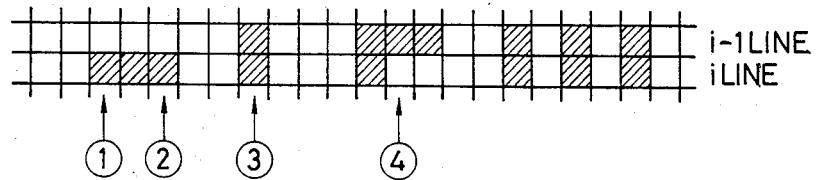
FIG. 5A and 5B are diagrams indicating various states of an original image, an analog picture signal representing the various states of the original image, and threshold levels for binary decision.
Figure 5B:
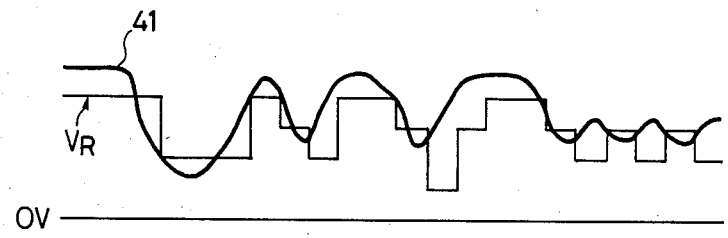

The operation of the picture signal discriminating circuit thus organized will be described with reference to FIGS. 5A and B. FIG. 5A shows the picture elements of the (i−1)th line and i-th line of an original. In FIG. 5A, picture elements shaded with oblique lines are black picture elements, and those which are not shaded are white picture elements. In this case, the analog picture signal outputted by the image pickup device reading the i-th line is as indicated by the curve 41 in the FIG. 5B.

Assume that, in FIG. 5A, a black picture element indicated at 1 is the aimed picture element. This black picture element is located immediately after a series of white picture elements. Accordingly, in the prior art, as the signal level of the analog picture level is not sufficiently low, the black picture is liable to be mistaken for a white picture element in binary-encoding. The decision levels for the two adjacent picture elements of the aimed picture element 1 are the signal "0" (white), corresponding to row 1 in FIG. 3. Therefore, the voltage $V_R$ is the highest of four values (the part (b) of FIG. 5). As a result, comparator 22 correctly binary-encodes the aimed picture element as a black picture element.

Considering now the case where the black picture element 3 in FIG. 5A is the aimed picture element. According to row 3 in FIG. 3, the voltage $V_R$ would be the second in increasing order. As the analog picture signal is lower than the voltage, the aimed picture element 3 is correctly determined as a black picture element.

Now considering the case where the aimed picture element is the black picture element 2 in FIG. 5A. The aimed picture element 2 is the black picture element which is subsequent to a black picture element; however, since the adjacent picture element on the preceding line is white, the threshold level voltage is the second in the increasing order, corresponding to row 2 in FIG. 3. Thus, it is correctly determined as a black picture element.

Where the white picture element 4 in FIG. 5A is the aimed picture element, both of the adjacent picture elements of the aimed picture element are black and the white level is considerably low. This condition corresponds to row 4 in FIG. 3, and the voltage $V_R$ is the lowest. Accordingly, the comparator 22 can correctly binary-encode the aimed picture element 4 as a white picture element.

As is apparent from the above description, in the embodiment of the invention, the resistances $r_1$, $r_2$ and $r_3$ of the resistors 25, 26 and 28 are so selected to meet the relation $r_1 > r_2 > r_3$, so that the adjacent picture element on the same line as the aimed picture element is weighted larger than that on the preceding line. It goes without saying that these resistances and accordingly the ratios of them can be changed according to the cause for picture quality deterioration of the analog picture signal, the relationship between the picture density in the main scanning direction and that in the auxiliary scanning direction, or the characteristic of the image pickup system. In addition, the threshold level may be simply determined by using only the adjacent picture element on the same line, or it may be set in an intricate manner by providing more reference picture elements.

What is claimed is:

1. A picture signal discriminating circuit for encoding an analog picture signal which is obtained by raster-scanning picture element targets ($S_{i,j}$) in an original picture, said circuit comprising:
    a. a comparator for binary-encoding said analog picture signal by comparing said picture signal to a threshold level, and
    b. threshold level setting means for changing the threshold level of said comparator into one of a plurality of values according to previously binary-encoded values of said analog picture signal, said previously binary-encoded values corresponding to the picture elements of said original picture in the same raster immediately adjacent the target being scanned ($S_{i,j-1}$) and in the prior raster immediately adjacent the target being scanned ($S_{i-1,j}$), and
    said threshold level having a maximum value determined according to a peak value of said previously binary-coded values.

2. A picture signal discriminating in claim 1, wherein said threshold level setting means includes means for detecting the peak value of said analog picture signal; means for dividing the voltage of said peak value detecting means to obtain said comparator threshold level; and means for changing the voltage division ratio of said voltage dividing means according to the signal states previously binary-encoded values of said analog picture signal.

3. A picture signal discriminating circuit in claim 2, wherein said comparator creates a succession of binary values each corresponding to a different picture element of said original picture and wherein said threshold level setting means sets a threshold level according to the binary values of a picture element located on the same line and immediately before a picture element to be binary-encoded and a picture element which is located adjacent to and on the preceding raster scan line line as said picture element to be binary-encoded.

* * * * *